US012495760B2

(12) United States Patent
Earls

(10) Patent No.: US 12,495,760 B2
(45) Date of Patent: *Dec. 16, 2025

(54) CUBICLES FOR BOVINE ANIMALS AND ACCESSORIES THEREFOR

(71) Applicant: Michael Earls, County Galway (IE)

(72) Inventor: Michael Earls, County Galway (IE)

(*) Notice: Subject to any disclaimer, the term of this patent is extended or adjusted under 35 U.S.C. 154(b) by 0 days.

This patent is subject to a terminal disclaimer.

(21) Appl. No.: 18/421,509

(22) Filed: Jan. 24, 2024

(65) Prior Publication Data

US 2024/0156044 A1 May 16, 2024

Related U.S. Application Data

(63) Continuation of application No. 17/193,003, filed on Mar. 5, 2021, now Pat. No. 11,910,777.

(30) Foreign Application Priority Data

Mar. 6, 2020 (GB) .................................. 2003315

(51) Int. Cl.
*A01K 1/00* (2006.01)

(52) U.S. Cl.
CPC .................................. *A01K 1/0011* (2013.01)

(58) Field of Classification Search
CPC ...... A01K 1/00; A01K 1/0011; A01K 1/0017; A01K 1/0088; A01K 1/0094; B62H 3/00; B62H 3/02; B62H 3/04; B62H 3/08; A47F 10/04; E04F 2011/1819; E04F 2011/1821; E04F 2011/1868; E04F 2011/1876
See application file for complete search history.

(56) References Cited

U.S. PATENT DOCUMENTS

| 6,026,766 | A | * | 2/2000 | Albers | ................... | A01K 5/00 |
| | | | | | | 119/520 |
| 7,523,904 | B2 | * | 4/2009 | Carnevali | ............... | E04G 3/00 |
| | | | | | | 248/278.1 |
| 10,047,531 | B2 | * | 8/2018 | Rogers | ...................... | E04G 5/16 |
| D891,905 | S | * | 8/2020 | Carnevali | ...................... | D8/354 |
| 2005/0263092 | A1 | * | 12/2005 | Moreau | ..................... | A01K 1/00 |
| | | | | | | 119/516 |
| 2012/0005973 | A1 | * | 1/2012 | Bishop | ...................... | E04F 11/18 |
| | | | | | | 52/184 |
| 2015/0275942 | A1 | * | 10/2015 | Carnevali | ................. | F16B 2/10 |

* cited by examiner

*Primary Examiner* — Joshua J Michener
*Assistant Examiner* — Henry Hooper Mudd
(74) *Attorney, Agent, or Firm* — Whiteford, Taylor & Preston, LLP; Gregory M. Stone

(57) ABSTRACT

A projection is provided on a side barrier of a cubicle or stall for a bovine animal, the projection being positioned at the open end of the cubicle through which the animal enters the cubicle. The projection defines a region of reduced opening width which forces the animal to straighten its entry into the cubicle, thereby promoting a straight lying position without reducing the lying area available for the animal within the cubicle. A straight lying position encourages the animal's waste to be deposited away from the animal's bed into a waste channel in the passageway outside the cubicle. Preferably a pair of projections are provided, extending towards one another from the opposed side barriers, such that the reduced opening width region is centered within the overall opening width. The projection is preferably provided as an accessory which can be mounted on the rails of an existing cubicle.

9 Claims, 8 Drawing Sheets

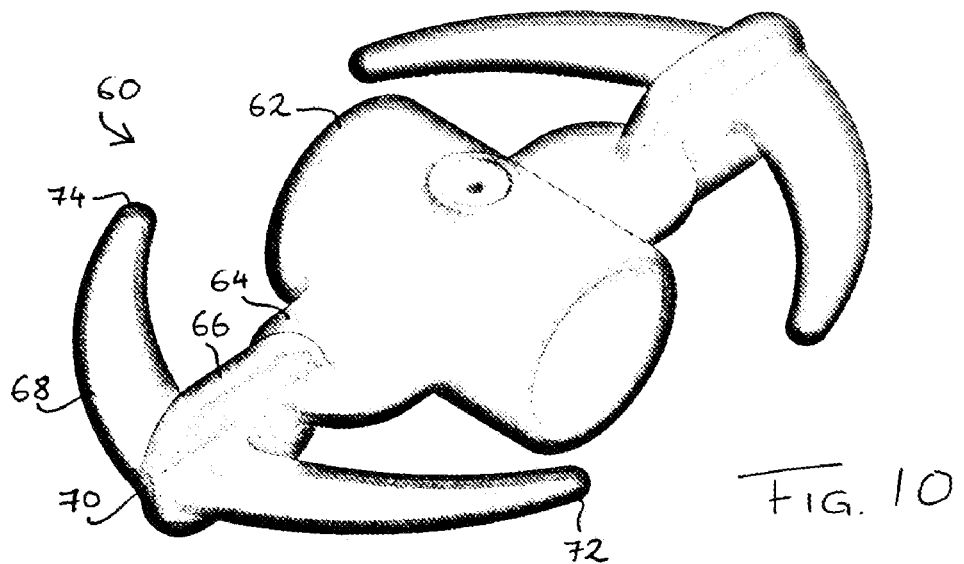
FIG. 10
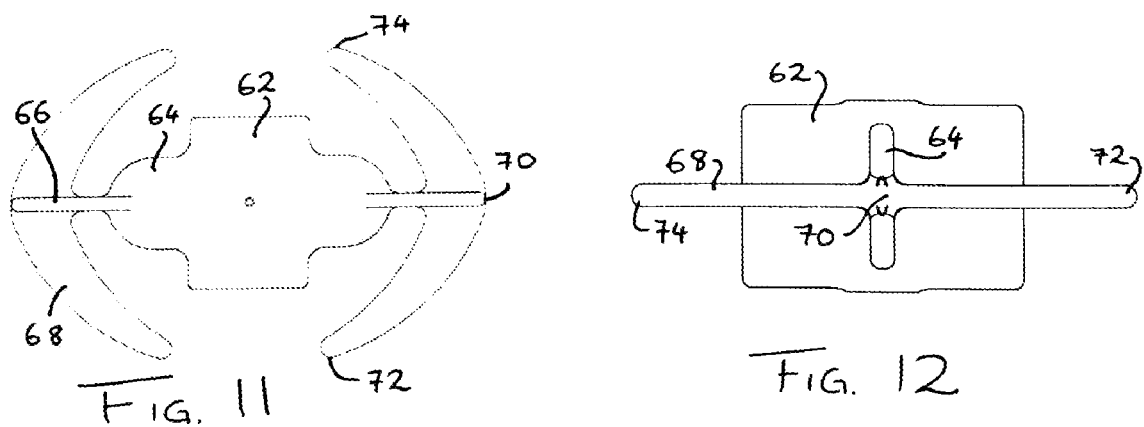
FIG. 11
FIG. 12
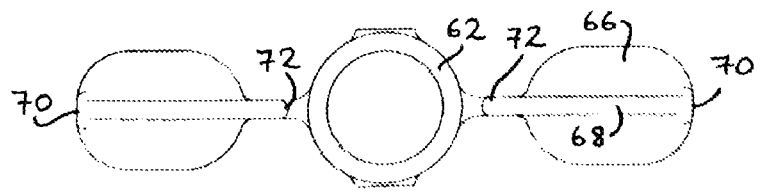
FIG. 13

CUBICLES FOR BOVINE ANIMALS AND ACCESSORIES THEREFOR

CROSS-REFERENCE TO RELATED APPLICATIONS

This application is a continuation of co-pending U.S. patent application Ser. No. 17/193,003 titled "Cubicles For Bovine Animals And Accessories Therefor," filed Mar. 5, 2021, which claims priority to Great Britain patent application No. 2003315.5 filed Mar. 6, 2020. The contents of these applications are incorporated herein by reference in their entirety.

TECHNICAL FIELD

This invention relates to cubicles (or stalls) for bovine animals and accessories therefor, in particular to cubicles of the type having a pair of opposed side barriers defining the sides of a generally rectangular area to accommodate a bovine animal and an opening between the opposed side barriers at one end of said generally rectangular area, the opening being the same width as the generally rectangular area and being sized to admit a bovine animal into said rectangular area.

BACKGROUND ART

Cattle cubicles or stalls or the aforementioned type are widely used. They are designed to accommodate a single cow, which enters the cubicle by walking in through the opening, and have a length to accommodate the cow when standing or lying down. The end of the rectangular area opposite the opening is closed off, usually with one or more rails.

A correctly positioned cow will stand or lie with its tail projecting over a waste channel in the passageway outside the opening of the cubicle, so that urine and faeces are collected in the waste channel where they are more easily cleaned by a conventional scraper cleaning system. This aids in the efficiency of cleaning the cubicles and improves animal health by reducing the occurrence of mastitis and infection which can otherwise result when the cow soils its cubicle.

A cow lying at an angle means she will be encroaching on the cow space of the adjoining stalls, which is a problem. Lying straight generally prevents this.

When a cow gets up from a resting position the first thing they generally do is to deposit waste. A cow lying at an angle will rise to stand at the same angle and will generally deposit on the corner of the mat and not into the manure channel.

Regulations, which vary from country to country, dictate a minimum lying area for a cow. In general such areas are sufficiently large as to accommodate a cow in a number of positions. Frequently, cattle will therefore lie down at an angle to the side barriers, i.e. diagonally within a cubicle, such that their waste is deposited in the lying area rather than the waste channel.

It would therefore be advantageous to provide a cubicle design which respects the minimum lying area regulations while also ensuring that the cow is positioned correctly, parallel to the side barriers.

DISCLOSURE OF THE INVENTION

There is provided a cubicle for a bovine animal, comprising:

a. a pair of opposed side barriers defining the sides of a generally rectangular area to accommodate a bovine animal;

b. an opening between the opposed side barriers at one end of said generally rectangular area, the opening being the same width as the generally rectangular area and being sized to admit a bovine animal into said rectangular area; and characterised by c. at least one projection mounted on a side barrier at a height above ground level, said projection extending from the side barrier towards the other side barrier, and thereby defining a region of reduced width at said height to encourage a bovine animal positioned at or moving past said projection the animal to align itself generally parallel to the side barriers, without reducing the rectangular area at ground level.

Reducing the opening width by means of a projection restricts the animal's access into the cubicle, and can encourage correct positioning without reducing the required lying area within the cubicle.

It has been found that by encouraging the cow to enter the cubicle straight, one also encourages the cow to lie down in a straight position, meaning that they do not encroach on adjoining spaces. Also when they stand up they are likely to be standing straight and therefore depositing waste into the manure channel and not onto the corner of the mat.

Preferably, a pair of said projections are provided, each mounted on a respective one of the side barriers.

Having a pair of projections, one on each side, will tend to centre the animal within the cubicle.

Preferably, the pair of projections are aligned with one another such that they are opposed to one another and are positioned vertically at the same height from the ground, and together define a region of reduced width at the height at which they are mounted.

In a preferred embodiment, the side barriers have generally parallel top and bottom rails connected at the opening end by a tubular connector, with the projection being mounted on a top rail adjacent the tubular connector, or on the upper half of said tubular connector.

Preferably the projection is positioned at a height above the ground of between 40 cm (bottom of belly) and 150 cm (top of back).

It will be appreciated that the projections, being positioned above the ground and at the same height, define a limited region of reduced width that can be provided at a suitable height to engage with e.g. the shoulders or abdomen of the cow. The opening still appears to the cow to be of a normal width, as the projections will not extend the full height of the side barriers.

Preferably, the or each projection has a vertical height of less than 50 cm, preferably less than 20 cm, and more preferably less than 15 cm.

Such a projection occupies a relatively small fraction of the height of the opening and the height of the animal itself, and will not be viewed by the animal as substantially occluding the opening.

Preferably, the projection is disposed at the end of the side barrier adjacent the opening, to thereby reduce the width of the opening at said height.

In other embodiments, the projection is disposed in a position between 25% and 75% along the length of the side barrier from the opening to the head end.

In certain embodiments, the side barrier has two or more projections, one disposed at the end of the side barrier adjacent the opening, and the other disposed in a position between 25% and 75% along the length of the side barrier from the opening to the head end.

In preferred embodiments, the or each projection comprises an arm extending horizontally into the width of the cubicle.

Preferably, the arm has a rounded profile at an end distal from the side barrier from which it extends.

The rounded end of the arm is more comfortable and reduces the chances of injury when the animal presses against it.

The rounded profile may for example be spherical.

In other embodiments, the rounded profile is a fin having a rounded profile outwardly of the arm.

Preferably, the fin is generally planar and disposed in the horizontal plane, with the rounded profile defining a fin whose horizontal extent into the cubicle width increases towards the centre thereof.

In some embodiments, the projection comprises a curved longitudinal member connected at either end to the side barrier.

Preferably, the curved longitudinal member comprises a flexible, curved, generally cylindrical arm forming an arc which extends into the width of the cubicle.

Preferably, the or each projection further comprises a mounting portion from which said arm extends.

Preferably, the mounting portion comprises a socket to receive a tubular component of the side barrier and fixing means to affix the projection in position on said tubular component.

Preferably, the mounting portion comprises a collar within which said socket is defined as a generally cylindrical opening sized to closely fit a tubular member of the side barrier.

The mounting portion holds the projection in position and the affixing means should be designed to prevent the projection being dislodged or rotated when subjected to the full pressure of a cow bearing against it as the cow walks into the cubicle at an angle. The projection and its mounting on the side barrier should be sufficiently robust to press back against the cow and force it straighten its entry into the cubicle.

Optionally, the or each projection is integrally formed with the side barrier from which it extends.

Such an integral projection may be preferable for new installations of cubicles. However, a non-integral projection, which is provided with means for mounting on an existing rail or tubular member of a side barrier, is preferred for retrofitting on existing barriers, and may also be more cost effective for new installations due to the ability to use standard tubular members in the construction of the side barriers.

Preferably, the side barriers are configured to flex resiliently when subjected to a sideways force from an animal entering or occupying the cubicle.

Preferably, the or each projection is formed of a resilient material.

In preferred embodiments, at least one of said side barriers is a common side barrier to each of a pair of adjacent cubicles, and a projection extends from each side of said common side barrier into the adjacent openings.

Preferably, said projection comprises a pair of arms extending horizontally in opposite directions from a common mounting portion.

Preferably, the mounting portion comprises a socket to receive a tubular component of the side barrier and fixing means to affix the projection in position on said tubular component with the arms extending in opposite directions into the widths of the adjacent cubicles.

There is also provided an accessory for a cow cubicle of the type comprising a pair of opposed side barriers having tubular components, the side barriers defining the sides of a generally rectangular area to accommodate a bovine animal, and an opening between the opposed side barriers at the other end of said generally rectangular area, the opening being the same width as the generally rectangular area and being sized to admit a bovine animal into said rectangular area; the accessory comprising:

a. a mounting portion comprising a socket to receive a tubular component of a side barrier and fixing means to affix the accessory in position on said tubular component; and b. a projection extending from said mounting portion such that when the accessory is mounted on a side barrier, the projection extends partially into the width of the cubicle and thereby defines a region of reduced width; whereby when said accessory is mounted in position at a height above ground level, it encourages a bovine animal positioned at or moving past said projection to align itself generally parallel to the side barriers, without reducing the rectangular area at ground level.

Preferably, the projection has a height of less than 50 cm.

More preferably, the projection has a height of less than 20 cm.

In preferred embodiments, the projection has a height of less than 15 cm, such as for example from 5-15 cm, preferably 8-12 cm.

Preferably, the projection has a rounded profile at an end distal from the mounting portion.

Preferably, the projection is formed of a resilient material.

BRIEF DESCRIPTION OF THE DRAWINGS

The invention will now be further illustrated by the following description of embodiments thereof, given by way of example only with reference to the accompanying drawings, in which:

FIG. 10 is a perspective view from above of a further accessory for a cubicle;

FIG. 11 is a plan view from above of the accessory of FIG. 11;

FIG. 12 is a side elevation of the accessory of FIG. 11;

FIG. 13 is an end elevation of the accessory of FIG. 11;

DETAILED DESCRIPTION OF PREFERRED EMBODIMENTS

Referring to FIGS. 1-4, there is indicated generally at 10 an arrangement of cubicles for cattle, comprising a double row of cubicles 12, each cubicle being defined between a pair of adjacent side barriers 14 mounted on ground posts 16, with each ground post 16 supporting two side barriers 14 mounted in opposite directions.

Figure 2:
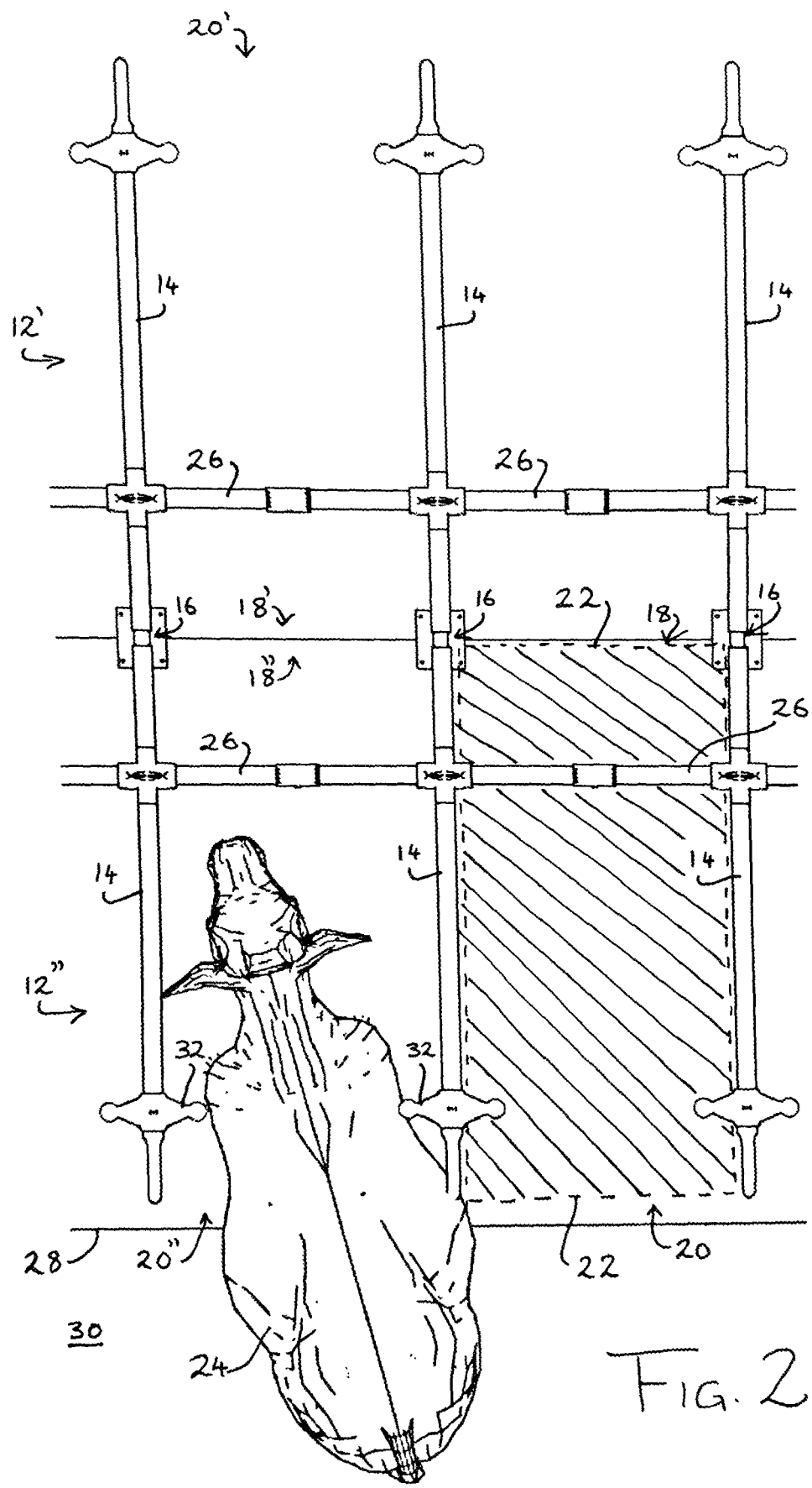
FIG. 2 is a plan view of four adjacent cubicles from the arrangement of FIG. 1.

With particular reference to FIG. 2, each cubicle can be seen to define a generally rectangular area 22 denoted by the hatched lines in FIG. 2. The rectangular area is defined between a pair of side barriers 14 and has an open end 20 and a head end 18. In the illustrated embodiment the head ends are not closed, although it will be appreciated that the head end might be defined by a wall, a rail or a barrier of some sort. In the illustrated embodiment, a cow 24 entering the cubicle is instead prevented from progressing through the head end 18 into the adjacent opposed cubicle by a neck rail 26 positioned at a height that blocks the cow from walking forward but allows the cow to lie with its head at the head end.

Due to the double row arrangement of cubicles facing one another, the head end 18' of a given cubicle in one row of cubicles 12' (FIG. 2) is adjacent the head end 18" of the opposed cubicle in the opposed row 12". The opening 20' and the opening 20" of an opposed pair of cubicles are located at the other ends of the cubicles and thus spaced apart from one another by the combined lengths of two cubicles.

Figure 1:
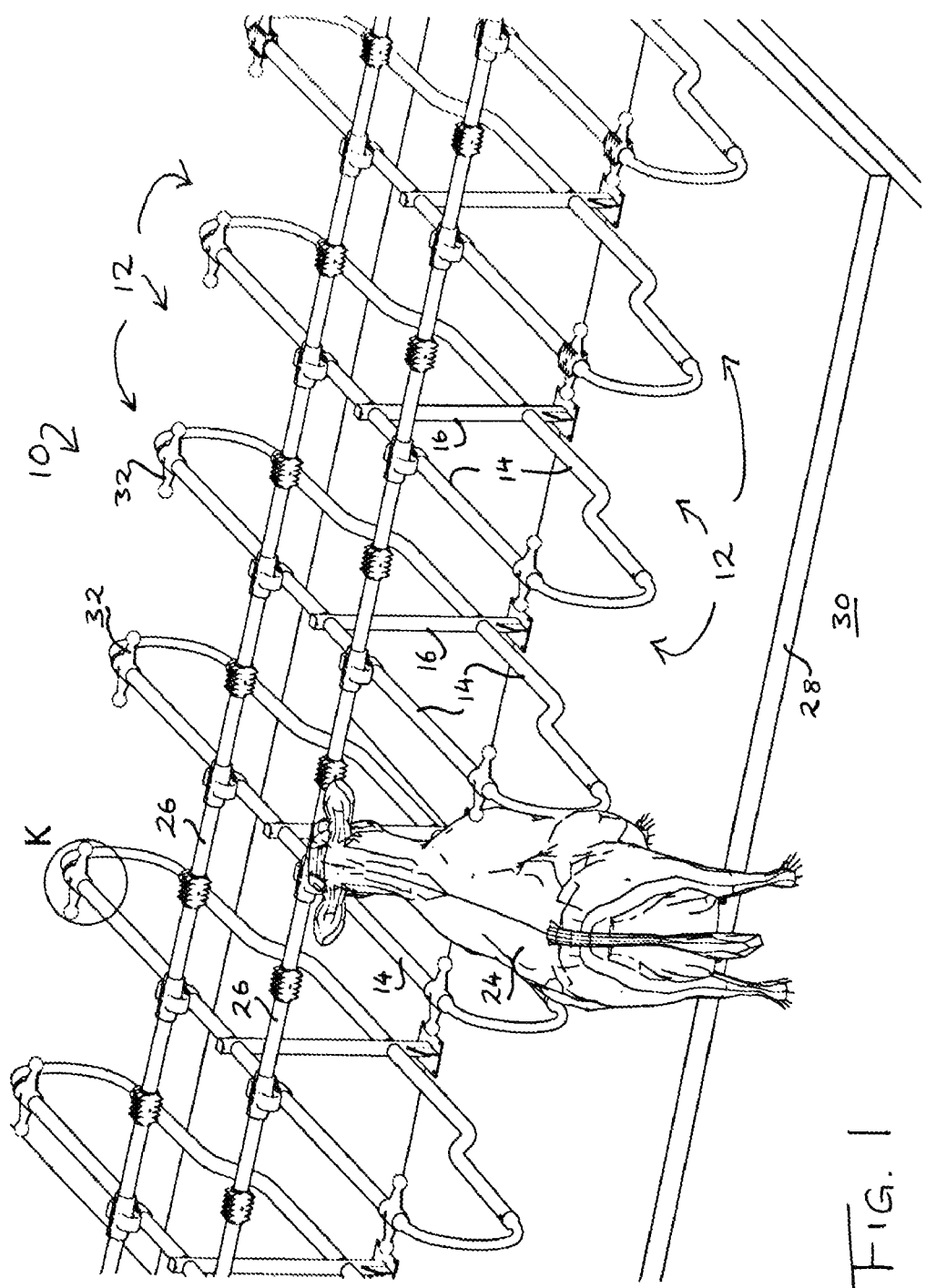
FIG. 1 is a perspective view of an arrangement of cubicles for cattle.

Cows 24 enter the cubicles by walking forwards through the opening 20 as shown in FIGS. 1 and 2. Frequently the cow will enter at an angle, which can result in the cow settling down to lie at an angle diagonally in the cubicle. When lying at an angle the cow's waste is likely to soil the corners of the cubicle bed beside or under the ends of the side rails 14. Conversely if the cow lies aligned with the side rails, the cubicle is designed so that waste is much more likely to fall over the end ledge 28 of the cubicle area onto the passageway 30 where it can easily be cleaned.

When the waste falls onto the cubicle bed, hygiene is compromised, leading to a higher incidence of infections and complications such as mastitis. Therefore, for animal welfare reasons it is far preferable that the cow should lie straight in the cubicle.

Narrower cubicles could force the cow to align with the side rails, but regulations and legislation dictate minimum lying areas 22 for each cubicle. Therefore, the spacing between the pair of side rails defining a cubicle cannot be reduced beyond a minimum value.

To address this problem, each cubicle is provided with a pair of opposed projections 32 which in the embodiment of FIGS. 1-4 are located at the end of the side rails 14 adjacent the opening.

Figure 3:
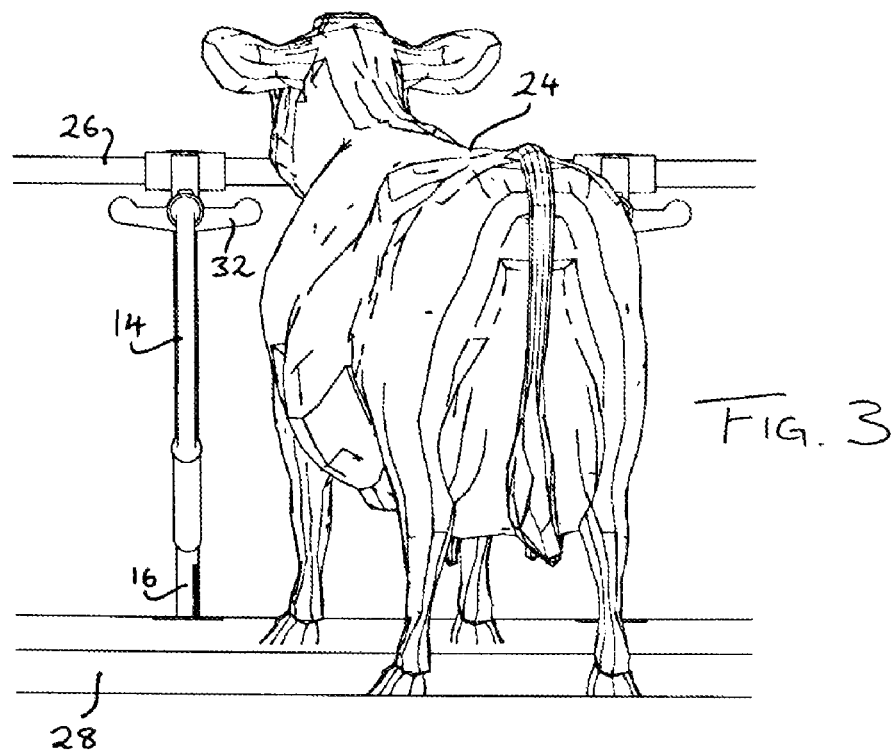
FIG. 3 is an end elevation of a cubicle from the arrangement of FIG. 1.
Figure 4:
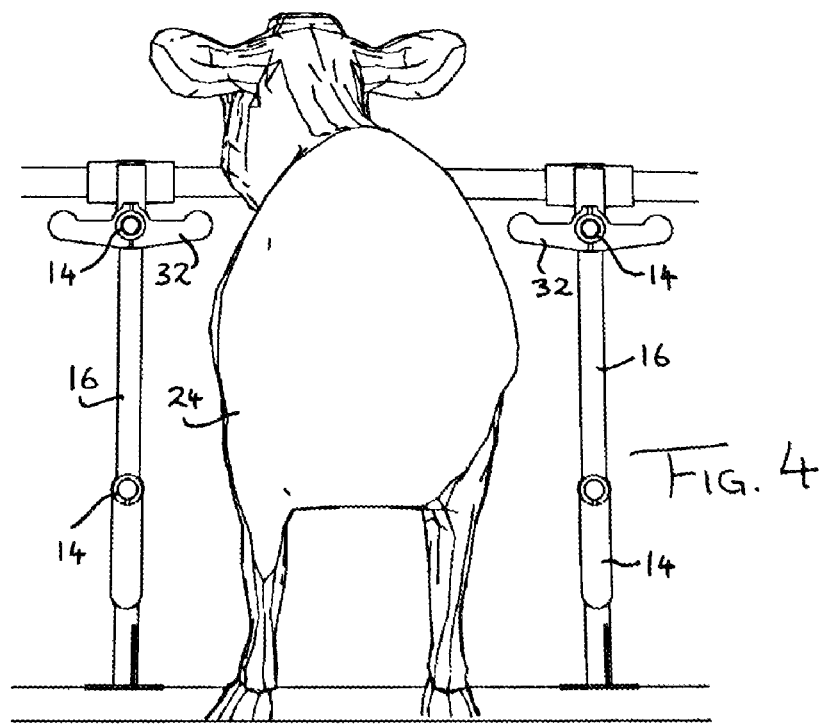
FIG. 4 is a sectional elevation of the cubicle of FIG. 3, taken through the centre line of the projection members.

Referring to FIGS. 2 and 3, when a cow attempts to enter a cubicle at an angle, the projections are positioned at a height to engage with and bear against the cow's upper abdomen, forcing or at least encouraging the cow to straighten up and align itself as shown in FIG. 4 (which is a cross section through the cubicle and cow taken along the line of the projections).

Figure 5:
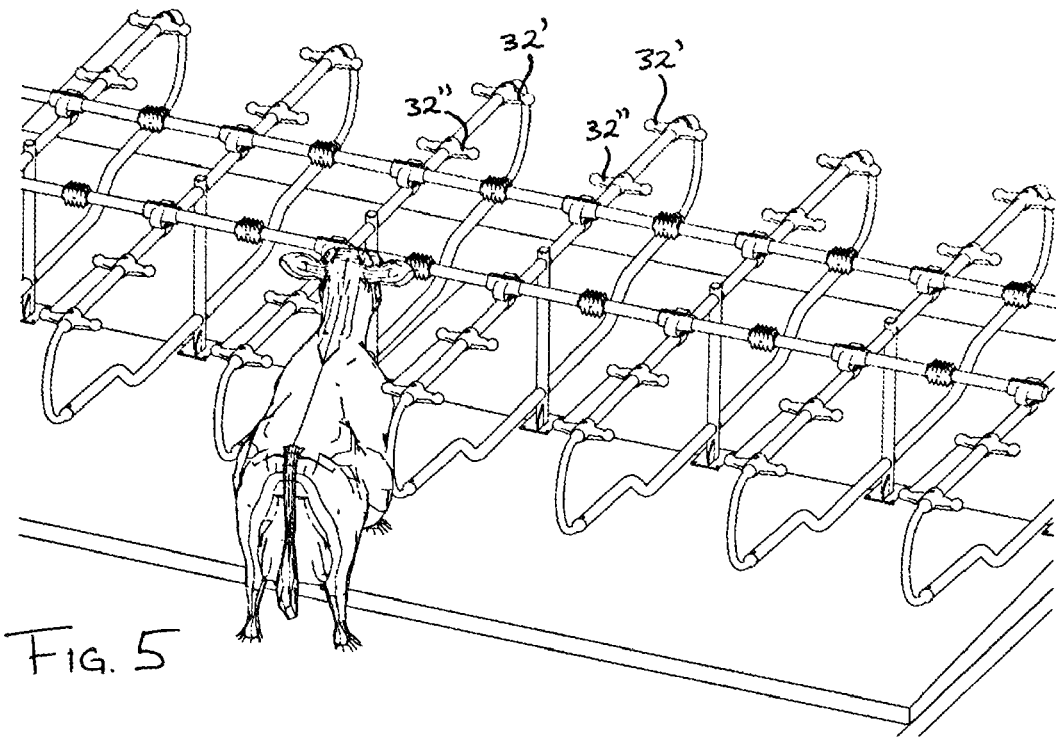
FIG. 5 is a perspective view of a second arrangement of cubicles for cattle.

FIG. 5 shows a similar arrangement of cubicles but with four projections extending into each cubicle, provided as a pair 32' disposed at the opening and a pair 32" disposed approximately halfway along the length of the cubicles.

Figure 6:
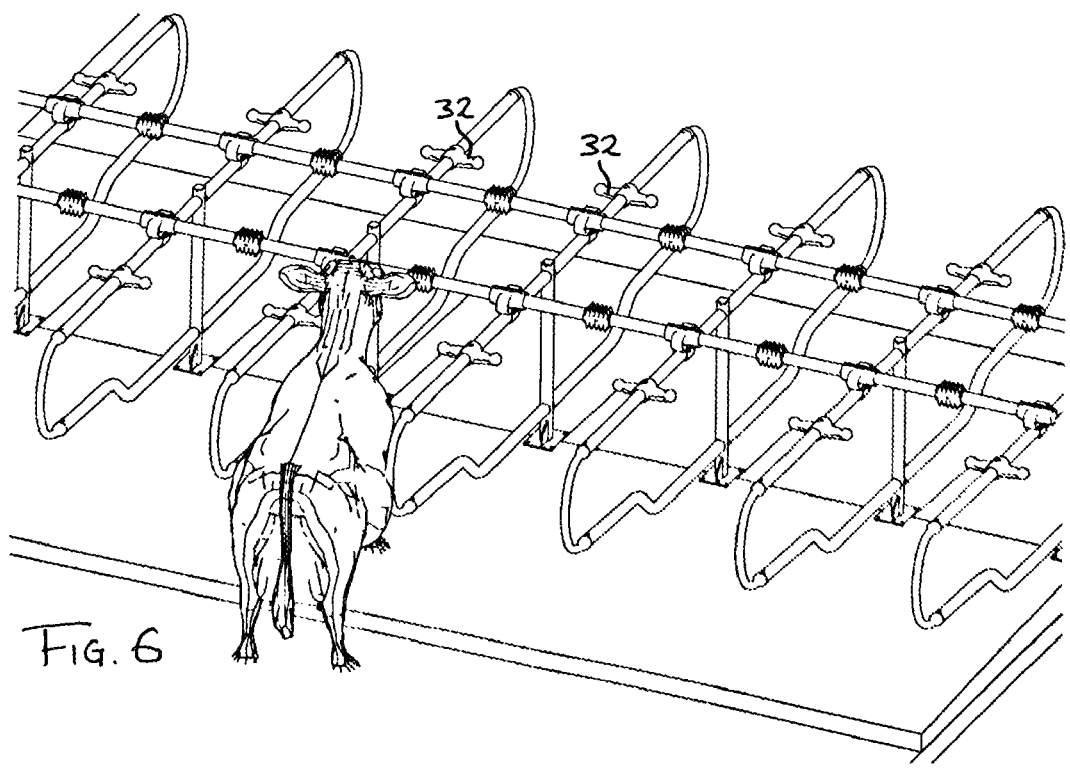
FIG. 6 is a perspective view of a third arrangement of cubicles for cattle.

FIG. 6 shows a further arrangement of cubicles with two opposed projections 32 per cubicle, which in this case are positioned approximately halfway along the length of the cubicle.

The projections used in the embodiments of FIGS. 1-4, 5 and 6, are positioned relatively high above the ground. It can be seen that they have the effect of reducing the experienced width of the cubicle for a standing cow positioned at or moving past the projections, apparently narrowing the opening and/or a point midway along the cubicle. However, the lying area for the cow is unaffected by the projections, as the lying cow is below the height of the projections, and thus has the full and uninterrupted cubicle width when lying down.

The projections described thus far are provided as an accessory for a cubicle allowing them to be retrofitted to existing cubicles. The accessory is shown on its own in FIGS. 7 and 8 from above and below respectively, and in an enlarged view when fitted to the cubicle in FIG. 9 (which corresponds to the detail identified in FIG. 1 within the circle denoted "K").

Figure 7:
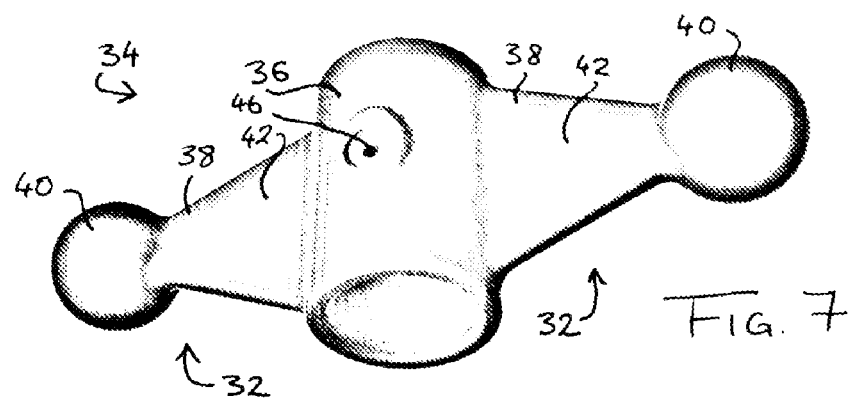
FIG. 7 is a perspective view from above of an accessory for a cubicle.
Figure 8:
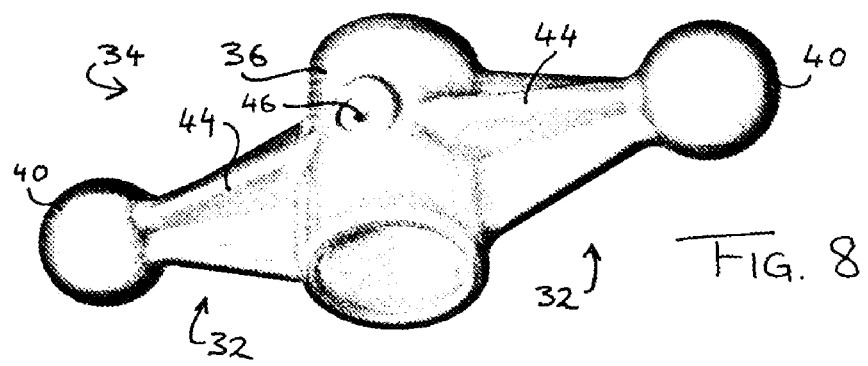
FIG. 8 is a perspective view from below of the accessory of FIG. 7.
Figure 9:
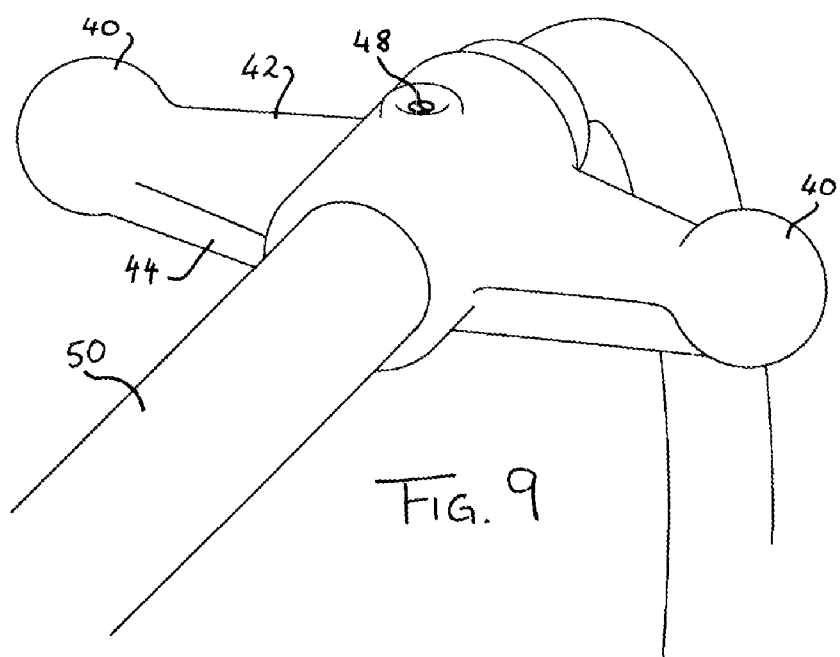
FIG. 9 is a perspective view of the accessory of FIG. 7 when mounted to a side rail of a cubicle.

Therefore, referring to FIGS. 7-9, the accessory 34 comprises a mounting collar 36 with a pair of projections 32 extending in opposite directions. Each projection 26 comprises an arm 38 having a rounded end 40, taking the form of a flattened triangular member 42 with a reinforcing web 44 on its underside, terminating at the rounded end 40 which is a generally spherical formation on the distal end of the arm 38. The rounded end guards against injury and eases discomfort when a cow bears against the projection.

Holes 46 are provided in the collar 36 on the top and underside to receive a fastener 48 (FIG. 9) that passes through a drilled hole (not shown) in the top rail 50 of the side barrier when the collar is mounted thereon to secure it in position against rotation or displacement.

It can be seen that with a pair of projections extending from either side, a single accessory is configured to provide projections into the widths of two adjacent cubicles sharing a common side barrier.

Referring to FIGS. 10-13, a further embodiment of accessory 60 is shown in perspective, top plan, side elevation and end elevation, respectively.

As with the accessory of FIGS. 7-9, the accessory comprises a mounting portion in the form of a collar to receive a tubular member of the side barrier and it is mounted in like fashion to the arrangement of FIG. 9. The skilled person will appreciate that in both cases, the mounting can be adapted to any suitable form to provide a stable mounting on the side barrier (e.g. if a different form of barrier is employed than one constructed with circular, tubular rails).

The projections extending from each side of the accessory 60 comprise an arm 64, 66 terminating at a rounded end which in this case takes the form of a fin 68 having a having a rounded profile outwardly of the arm.

The fin 68 is generally planar and disposed in the horizontal plane, with the rounded profile defining a fin whose horizontal extent into the cubicle width increases towards the centre 70 thereof. It tapers back towards the side rail at the front 72 and rear 74 ends of the fin. Again, this increases comfort and reduces injury potential.

Both accessories described above are preferably made of a flexible resilient material, such as moulded rubber. The hardness of the rubber can be chosen to withstand the force of a large animal and provide an appropriately resilient restoring force when an animal bears against the projections.

Figure 14:
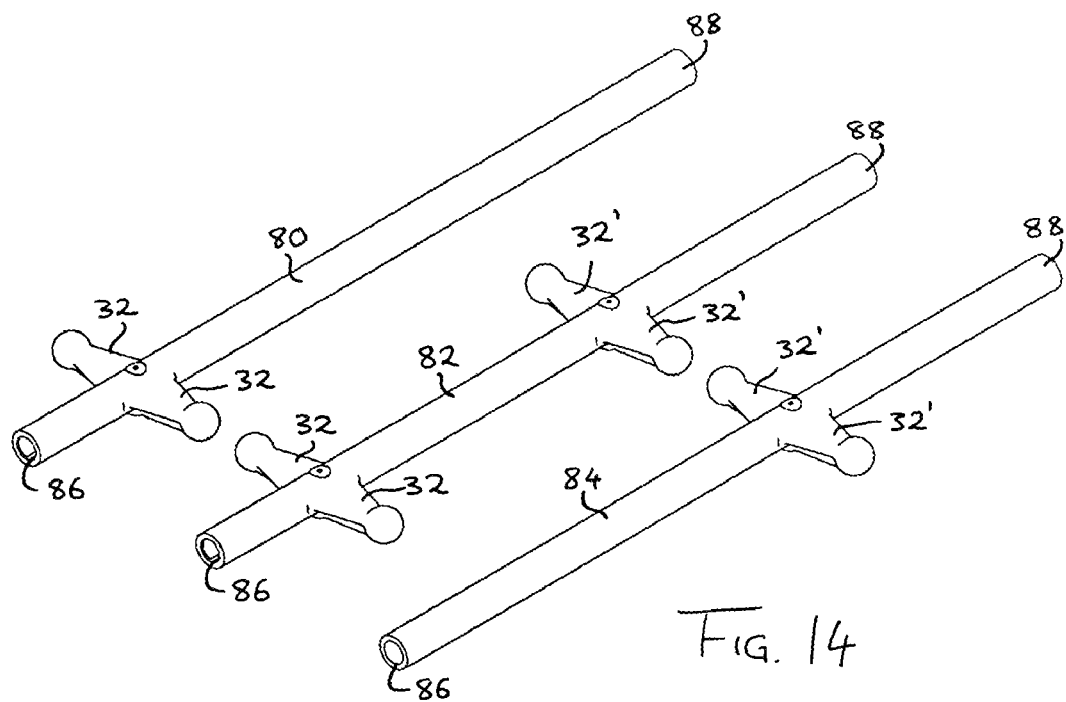
FIG. 14 is a perspective view of three side rails for cubicles shown alongside one another with integrally formed projections.

FIG. 14 shows three cubicle rail members 80, 82, 84 which are integrally moulded from a hard, resilient rubber with integral projections 32, 32'. Each rail member has an end 86 designed to be located at the opening end of the cubicle and an end 88 designed to be situated at the head end.

Figure 15:
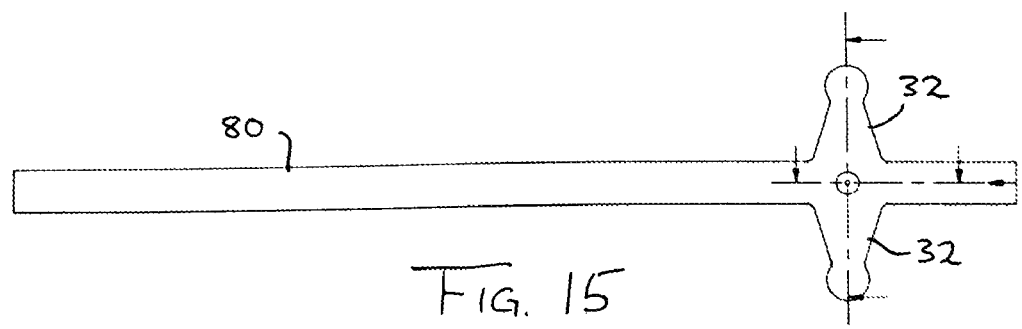
FIG. 15 is a plan view of one of the side rails of FIG. 14.

Rail member 80 is provided with a pair of projections 32, one extending on each side, situated generally at the opening end, and shown in plan view in FIG. 15. It will be appreciated that this rail member, when fitted in place of the existing top rail of the cubicle shown in FIGS. 1-4, provides the same effects.

It is to be understood that "at the opening end" and similar phrases as used herein denote that the location is such that the projections are adjacent the opening so that they engage a cow which is about halfway into the cubicle as seen in FIG. 2.

Rail member 82, which has a pair of projections 32 at the opening end and a pair of projections 32' in the middle half of the rail i.e. located along the length of the rail between 25% and 75% of the length of the rail (in this case, in position approximately 65% along the length of the rail from the opening to the head end). This rail can be substituted for the top rail and accessories of FIG. 5 to provide similar effects.

Rail member 84 has a single pair of integrated projections 32' located around 65% along the length of the rail from the opening end to the head end, and can be substituted for the top rail and accessories of FIG. 6 to provide similar effects.

Whether the projections are integrally formed with the rail, pre-mounted onto the rail as separate members in the factory, or retrofitted as cubicle accessories, is at the choice of the manufacturer and customer.

Figure 16:
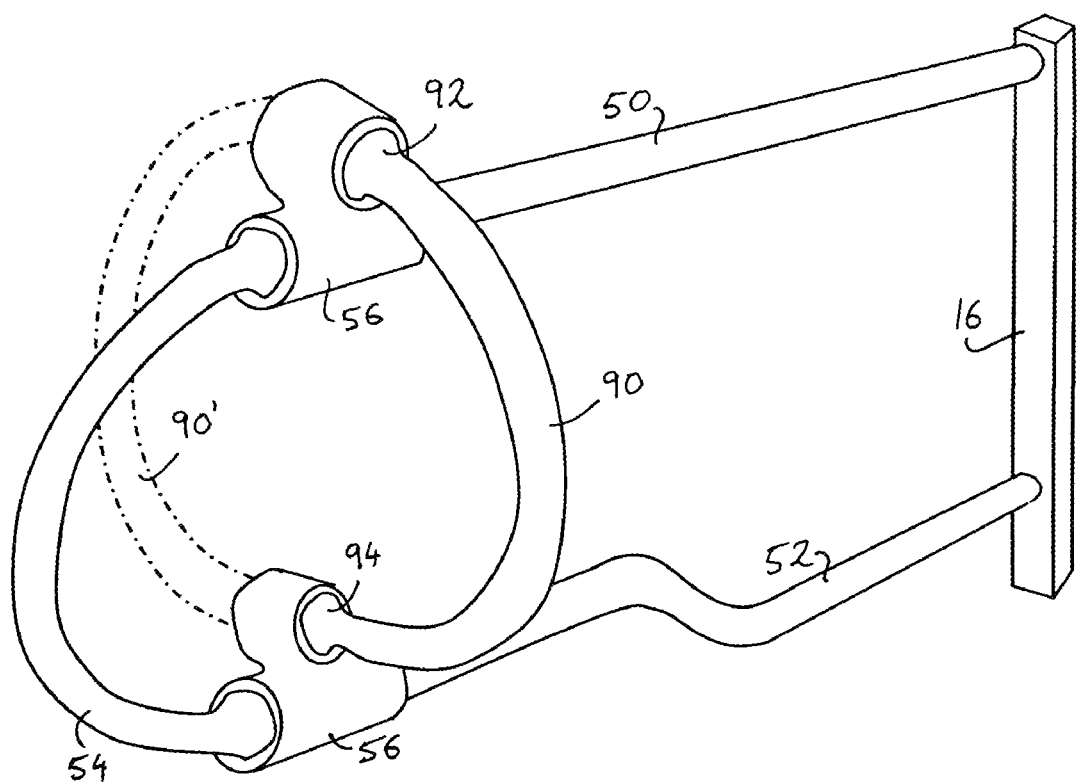
FIG. 16 is a perspective view of a side rail for a cubicle showing a further alternative projection design.

FIG. 16 shows a further embodiment of cubicle, with only one side rail shown for clarity. It will be appreciated that two such rails are used to define the two sides of a complete cubicle.

In FIG. 16, there can be seen the ground post 16 with a top rail 50 and bottom rail 52 mounted thereon. A curved connecting rail 54 is located at the opening end and connects at either end thereof into a pair of mounting sleeves 56.

Each mounting sleeve 56 is integrally formed with a pair of perpendicular collars or passages, one of which receives the curved connector 54 at one end and either the top rail 50 or bottom rail 52 at the other end, to mount these components of the side rail together. The other, perpendicular collar or passage extends in the direction of the width of the cubicle and is adapted to receive an end of a projection 90 taking the form of a curved longitudinal member connected at either end i.e. top 92 and bottom 94 to a respective mounting member 56.

It can be seen that the mounting members 56 can accommodate a second projection 90' on the opposite side (shown in broken outline) so that a pair of opposed projections extend into the respective cubicles defined on either side of the side barrier 50, 52, 54.

The curved longitudinal member comprises a flexible, curved, generally cylindrical arm forming an arc which extends into the width of the cubicle, and whose mid-section engages against the side of a cow entering the cubicle at an angle.

Although provided as a separate accessory with a specialised mounting member 56, the side barrier could be formed with the curved projection integrally formed with either or both of the top and bottom rails.

Also, although this embodiment shows the projection extending between the top and bottom rails, so that the arm lies in a vertical plane, it could be reconfigured to connect at both ends to the top rail alone, lying in a horizontal plane, or the bottom rail alone. It could also connect between either top or bottom rail and the curved connector 54 at the opening.

The curved arm defining the projection in FIG. 16 describes a generally subcircular arc. Other shapes can be employed to vary the height at which the projection engages against the cow, such as an asymmetric V-shape with a rounded apex, or to vary the extent of projection into the width of the cubicle, such as an arc of shallower depth.

It should be appreciated from the foregoing discussion that other forms of projection can be used and that the skilled person has a wide latitude in designing a suitable projection to take account of the cubicle design, the size and age of animal being housed, and the width of the cubicle.

The invention is not limited to the foregoing embodiments. The presence of features within the same embodiment which can be employed separately from one another in different designs of neck rail or receiver does not imply any teaching that these features are otherwise related or must be employed in conjunction with one another. The scope of the invention is defined by the claims which follow, when read in conjunction with the foregoing description and the accompanying drawings.

The invention claimed is:

1. An accessory for a cow cubicle of the type comprising a pair of opposed side barriers having tubular components, the side barriers defining the sides of a generally rectangular area to accommodate a bovine animal, and an opening between the opposed side barriers at the other end of said generally rectangular area, the opening being the same width as the generally rectangular area and being sized to admit a bovine animal into said rectangular area; the accessory comprising:
  a. a mounting portion comprising a socket to receive a tubular component of a side barrier and fixing means to affix the projection in position on said tubular component; and
  b. an arm extending from said mounting portion such that when the accessory is mounted on a side barrier, the arm extends partially into the width of the cubicle and thereby defines a region of reduced width;
  whereby when said accessory is mounted in position at a height above ground level, it encourages a bovine animal positioned at or moving past said projection to align itself generally parallel to the side barriers, without reducing the rectangular area at ground level;
  wherein the mounting portion including the socket, and the arm of the accessory are formed from a flexible resilient material.

2. An accessory according to claim 1, wherein the arm has a rounded profile at an end distal from the mounting portion.

3. An accessory according to claim 2, wherein the rounded profile is spherical.

4. An accessory according to claim 2, wherein the rounded profile is a fin having a rounded profile outwardly of the arm.

5. An accessory according to claim 4, wherein the fin is generally planar and disposed in the horizontal plane, with the rounded profile defining a fin whose horizontal extent into the cubicle width increases towards the centre thereof.

6. An accessory according to claim 1, wherein the arm comprises a curved longitudinal member connected at either end to the side barrier.

7. An accessory according to claim 6, wherein the curved longitudinal member comprises a flexible, curved, generally cylindrical arm which when mounted at both ends to a side barrier forms an arc which extends into the width of the cubicle.

8. An accessory according to claim 1, wherein the mounting portion comprises a collar within which said socket is defined as a generally cylindrical opening adapted to receive a tubular member of a side barrier.

9. An accessory according to claim 1, further comprising a second arm extending from said mounting portion in an opposite direction from said arm, such that when the accessory is mounted on a side barrier, the arm and the second arm each extend partially into the width of a respective cubicle of a pair of adjacent cubicles separated by the side barrier on which the accessory is mounted.

\* \* \* \* \*